US011909711B2

(12) United States Patent
Sayko et al.

(10) Patent No.: US 11,909,711 B2
(45) Date of Patent: Feb. 20, 2024

(54) DYNAMIC PORT ALLOCATIONS IN CARRIER GRADE NETWORK ADDRESS TRANSLATION NETWORKS

(71) Applicant: AT&T Intellectual Property I, L.P., Atlanta, GA (US)

(72) Inventors: Robert Sayko, Colts Neck, NJ (US); Avinash Lingala, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/324,015

(22) Filed: May 18, 2021

(65) Prior Publication Data

US 2022/0377044 A1 Nov. 24, 2022

(51) Int. Cl.
*H04L 61/2517* (2022.01)
*G06N 20/00* (2019.01)

(52) U.S. Cl.
CPC ......... *H04L 61/2517* (2013.01); *G06N 20/00* (2019.01)

(58) Field of Classification Search
CPC ............................ H04L 61/2517; G06N 20/00
USPC ........................................................ 709/245
See application file for complete search history.

(56) References Cited

U.S. PATENT DOCUMENTS

| | | | |
|---|---|---|---|
| 6,944,167 B1 * | 9/2005 | McPherson | H04L 61/2575 370/475 |
| 8,204,066 B2 * | 6/2012 | Chen | H04L 61/2517 370/466 |
| 2003/0154306 A1 * | 8/2003 | Perry | H04L 67/28 709/239 |
| 2004/0125760 A1 * | 7/2004 | Newberg | H04L 67/14 370/312 |
| 2004/0139228 A1 * | 7/2004 | Takeda | H04L 61/2567 709/227 |
| 2008/0126528 A1 * | 5/2008 | Takeda | H04L 61/2575 709/223 |
| 2019/0260204 A1 * | 8/2019 | Koval | G06N 3/126 |
| 2021/0160190 A1 * | 5/2021 | Rose | H04L 47/522 |
| 2021/0385230 A1 * | 12/2021 | Joshi | H04L 61/6022 |

FOREIGN PATENT DOCUMENTS

| | | | | |
|---|---|---|---|---|
| CN | 101854285 A | * | 10/2010 | ....... H04L 29/12386 |
| CN | 102882992 A | * | 1/2013 | |

OTHER PUBLICATIONS

Sayko et al., "Carrier Grade Network Address Translation Architecture and Implementation", U.S. Appl. No. 17/213,070, filed Mar. 25, 2021.

* cited by examiner

*Primary Examiner* — Wing F Chan
*Assistant Examiner* — John Fan

(57) ABSTRACT

An example method includes receiving a domain name server (DNS) query initiated by an endpoint device, determining a current port assignment for the endpoint device, changing an allocation of ports for the endpoint device from the current port assignment based on a predicted port allocation need for a current communication session associated with the domain name server query, and performing a network address translation in accordance with the allocation of ports for the endpoint device.

20 Claims, 4 Drawing Sheets

DYNAMIC PORT ALLOCATIONS IN CARRIER GRADE NETWORK ADDRESS TRANSLATION NETWORKS

The present disclosure relates generally to network architectures, and relates more particularly to an apparatus, method, and non-transitory computer readable medium for dynamically allocation ports in a carrier grade network address translation (CG-NAT) architecture network.

BACKGROUND

Internet traffic has grown exponentially over time. Various technologies are used to route traffic across the globe. Internet traffic may assign Internet protocol (IP) addresses to route traffic from a source to a destination. An example of a protocol used to assign IP addresses is Internet protocol version 4 (IPv4). However, IPv4 addresses are becoming a scarce commodity as the Internet growth exceeds the number of addresses available.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
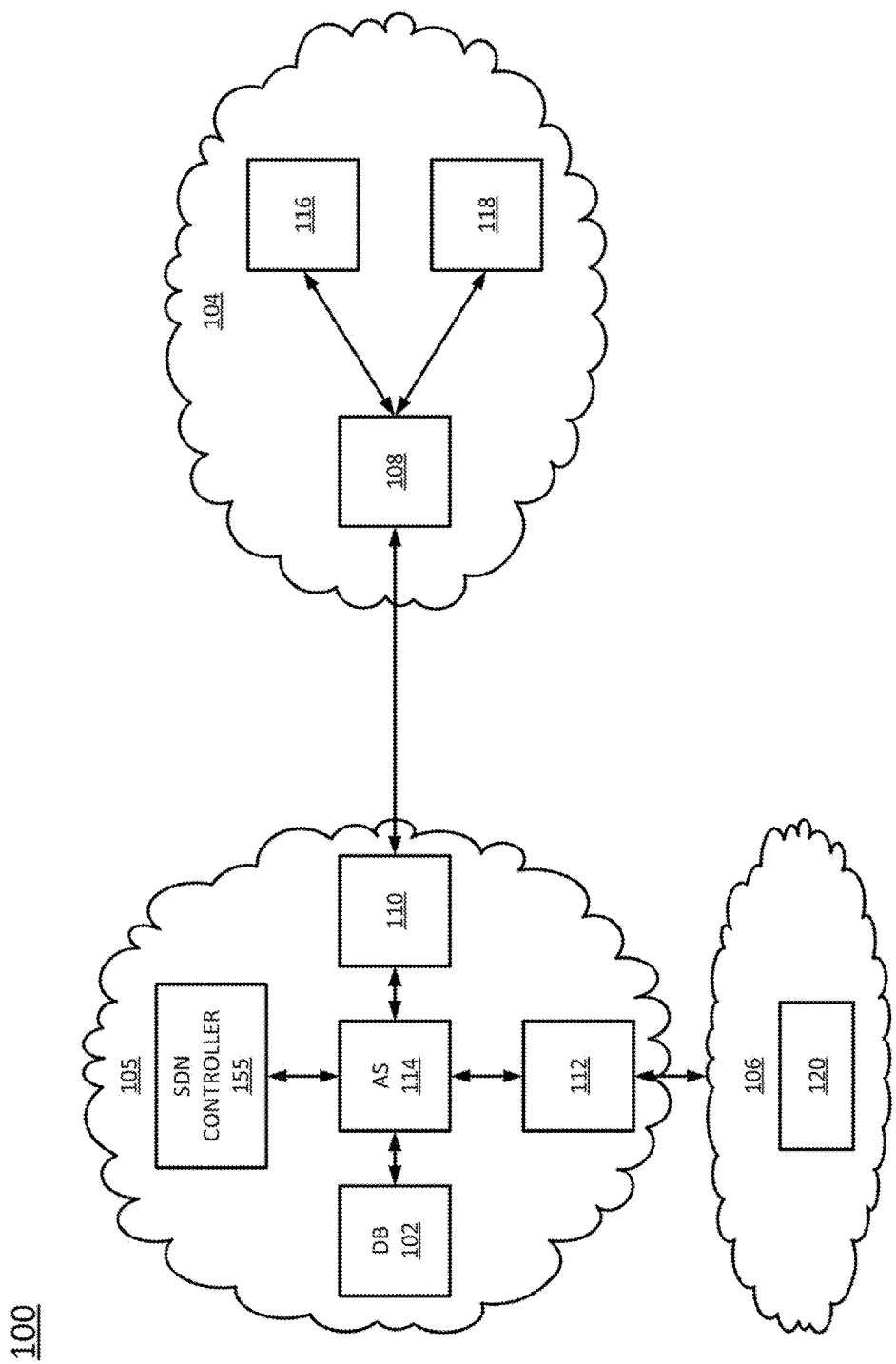
FIG. 1 illustrates an example network that uses a CG-NAT device of the present disclosure.

The present disclosure broadly discloses a method, non-transitory computer readable medium, and apparatus for dynamically changing port allocations in a CG-NAT architecture. In one example, a method performed by a processing system includes receiving a domain name server (DNS) query initiated by an endpoint device, determining a current port assignment for the endpoint device, changing an allocation of ports for the endpoint device from the current port assignment based on a predicted port allocation need for a current communication session associated with the DNS query, and performing a network address translation in accordance with the allocation of ports for the endpoint device.

In another example, a non-transitory computer-readable medium may store instructions which, when executed by a processing system in a communications network, cause the processing system to perform operations. The operations may include receiving a domain name server (DNS) query initiated by an endpoint device, determining a current port assignment for the endpoint device, changing an allocation of ports for the endpoint device from the current port assignment based on a predicted port allocation need for a current communication session associated with the DNS query, and performing a network address translation in accordance with the allocation of ports for the endpoint device.

In another example, a device may include a processing system including at least one processor and non-transitory computer-readable medium storing instructions which, when executed by the processing system when deployed in a communications network, cause the processing system to perform operations. The operations may include receiving a domain name server (DNS) query initiated by an endpoint device, determining a current port assignment for the endpoint device, changing an allocation of ports for the endpoint device from the current port assignment based on a predicted port allocation need for a current communication session associated with the DNS query, and performing a network address translation in accordance with the allocation of ports for the endpoint device.

As discussed above, IPv4 addresses are becoming a scarce commodity as the Internet growth exceeds the number of available addresses. CG-NAT may be used to bridge to the future use of Internet protocol version 6 (IPv6). Internet service providers (ISPs) may be incentivized to deploy CG-NAT due to the ability to efficiently utilize IPv4 addresses that are made available from the implementation of the CG-NAT architecture.

For example, users may share a routable or public IPv4 address that is assigned to a gateway or router. The router may then assign a private IP address with port allocations to different endpoint devices that are located behind the router. However, port allocations are static. That is, once the port allocations are assigned to different endpoint devices, the port allocations do not change.

However, some allocated ports may go unused by endpoint devices. At the same time, other endpoint devices may struggle with service quality as they are not allocated enough ports for their usage. Port allocations may be modified after disruptions or degradations of service are detected, but this may cause a poor user experience and may not prevent further service interruptions.

Examples of the present disclosure may provide a method that can provide dynamic port allocations to endpoint devices behind a router that share a public IP address such as an IPv4 address. For example, unused ports from one endpoint device can be dynamically allocated to another endpoint device. The present disclosure provides methods that can predict a necessary port allocation for an endpoint device and dynamically allocate ports to the endpoint device. As predicted usage falls, the ports may be unallocated from an endpoint device and re-allocated to other endpoint devices. As a result, user experience may be improved and the use of a limited number of available ports per IP address may be maximized. These and other aspects of the present disclosure are discussed in greater detail below in connection with the examples of FIGS. 1-4.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 104 and networks 106. Networks 104 and 106 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 104 and 106 may include different types of networks. In another example, the networks 104 and 106 may be the same type of network. The networks 104 and 106 may be controlled or operated by a same entity as that of network 105 or may be controlled or operated by one or more different entities. In one example, the networks 104 and 106 may comprise separate domains, e.g., separate routing domains as compared to the network 105. In one example, networks 104 and/or networks 106 may represent the Internet in general.

In one embodiment, the network 104 may be a local access network with a router 108. The router 108 may be communicatively coupled to a plurality of endpoint devices 116 and 118. The endpoint devices 116 and 118 may be any type of endpoint device (e.g., a desktop computer, a laptop computer, a mobile telephone, a tablet computer, a set top box, a smart appliance, and the like). The router 108 may be a residential gateway or router that aggregates IP traffic or data from a private side of the network 104 that includes the endpoint devices 116 and 118.

In one embodiment, the router 108 may be assigned an Internet protocol version 4 (IPv4) address that is shared by the endpoint devices 116 and 118 via private IP address and port assignments. The router 108 may route data to a particular endpoint device 116 or 118 based on port numbers and a private IP address received from network address translation performed by a CG-NAT architecture or network of the network 105, as described in further details below.

In one embodiment, the network 106 may be a public network, e.g., the Internet. The public network 106 may include a server 120 that hosts a website. The endpoint devices 116 and 118 may exchange data with the website hosted by the server 120. Although a single public network 106 and a single server 120 are illustrated in FIG. 1, it should be noted that any number of public networks and servers may be deployed and connected to the core network 105.

In one embodiment, a provider router or provider edge router 110 may perform CG-NAT functions. In another embodiment, a CG-NAT device may be located between the provider router 110 and the router 108 to perform the CG-NAT functions.

In one example, network 105 may transport traffic to and from endpoint devices 116 and 118. For instance, the traffic may relate to communications such as voice telephone calls, video and other multimedia, text messaging, emails, and so forth between the endpoint devices 116 and 118 and the server 120.

Figure 4:
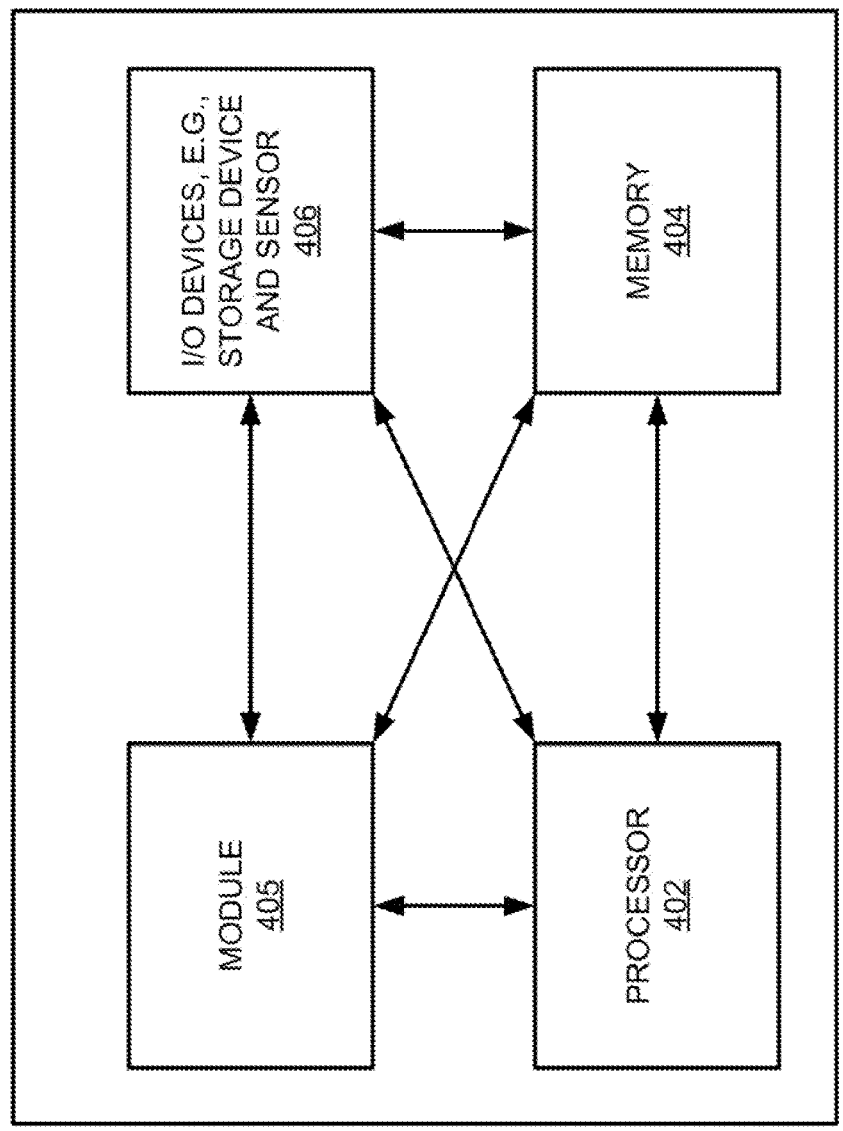
FIG. 4 depicts a high-level block diagram of a computing device or processing system specifically programmed to perform the functions described herein.

As further illustrated in FIG. 1, network 105 includes a software defined network (SDN) controller 155. In one example, the SDN controller 155 may comprise a computing system or server, such as computing system 400 depicted in FIG. 4, and may be configured to provide one or more operations or functions in connection with examples of the present disclosure for dynamically allocated ports between the endpoint deices 116 and 118 behind the public IP address assigned to the router 108. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure.

In one example, an application server (AS) 114 that may perform various network control functions within the core network 105 may be controlled and managed by the SDN controller 155. The AS 114 may be communicatively coupled to a database (DB) 102 that may store various information and data used by the AS 114 to perform the dynamic allocation of ports, as described in further details below. For instance, in one example, SDN controller 155 is responsible for such functions as provisioning and releasing instantiations of virtual network functions (VNFs) to perform the functions of routers, switches, and other devices, provisioning routing tables and other operating parameters for the VNFs, and so forth. In one example, SDN controller 155 may maintain communications with VNFs via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on a host device(s), or may comprise a dedicated device. For instance, SDN controller 155 may be collocated with one or more VNFs, or may be deployed in a different host device or at a different physical location.

The functions of SDN controller 155 may include the operation of the dynamic port allocation performed by the AS 114. For example, the SDN controller 155 may download computer-executable/computer-readable instructions, code, and/or programs (broadly "configuration code") for the AS 114, which when executed by a processor of the AS 114, may cause the AS 114 to perform DNS queries, network address translation, dynamic port allocation, and the like. In one example, SDN controller 155 may download the configuration code to the AS 114. In another example, SDN controller 155 may instruct the AS 114 to load the configuration code previously stored on the AS 114 and/or to retrieve the configuration code from another device in network 105 that may store the configuration code for one or more VNFs.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SDN controller 155, the AS 114, and/or other network elements may comprise functions that are spread across several devices that operate collectively as a SDN controller, an edge device, etc. Thus, these and other modifications of the system 100 are all contemplated within the scope of the present disclosure.

Figure 2:
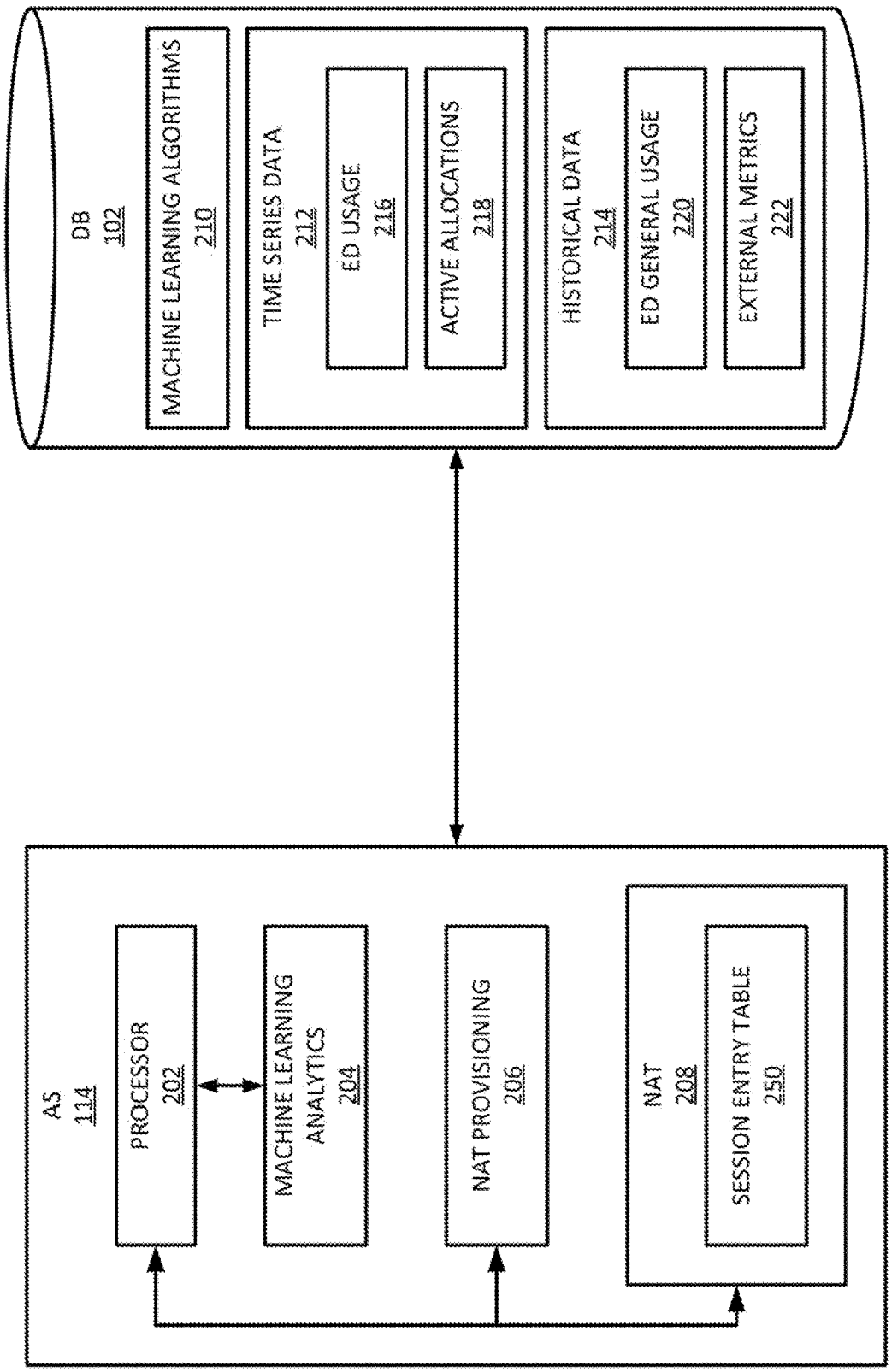
FIG. 2 illustrates a more detailed block diagram of the application server and how ports are dynamically allocated in the CG-NAT architecture of the present disclosure.

FIG. 2 illustrates a more detailed block diagram of the AS 114 and the DB 102. In one embodiment, the DB 102 may store information that can be used by the AS 114 to perform the functions described herein. For example, the DB 102 may include data that can be analyzed by the AS 114 or instructions that can be executed by the AS 114.

Although the DB 102 is illustrated as being a separate device from the AS 114, it should be noted that the DB 102 may be implemented as a part of the AS 114 as a single device. For example, the DB 102 may be part of the memory of the AS 114 or a separate memory partition of the AS 114.

In one embodiment, the DB 102 may store one or more machine learning algorithms 210, a time series of data 212, and historical data 214. In one embodiment, the machine learning algorithms 210 may receive the time series data 212 and the historical data 214 to analyze the data and predict a number of ports that an endpoint device 116 or 118 may need for a particular communication session, including dynamically adjusting for any changing conditions that may impact the particular communication session. Based on the predicted number of ports that may be needed, the AS 114 may dynamically reassign ports between the endpoint devices 116 and 118.

Notably, the present disclosure allows ports to be dynamically assigned before the endpoint device begins a communication session. Furthermore, in one embodiment, if necessary, the present disclosure may subsequently adjust those assigned ports during the communication session responding to changing conditions. In other words, the present disclosure provides the ability to predictively re-assign ports rather than reactively re-assigning ports after a problem or service disruption is detected. Predicting the number of needed ports for an endpoint device 116 or 118 may allow for a better user experience and avoid potential disruptions of service.

In one embodiment, the machine learning algorithms 210 may be executed by a machine learning model (MLM) (or machine learning (ML)-based model). In one embodiment, the MLM or ML may comprise the one or more machine learning algorithms 210 that have been "trained" or configured in accordance with input data (e.g., training data) to perform a particular service, e.g., to detect speech or other utterances in audio content, to identify words and phrases in speech and to convert to text, to identify intents and entities in natural language, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, generative adversarial networks (GANs), and so forth.

In one embodiment, the time series data 212 may include endpoint device (ED) usage 216 and active allocations 218. The time series data 212 may provide data related to a current state of an endpoint device and port allocations. For example, the ED usage 216 may provide information on what applications, active communication sessions, which websites are being visited, and the like. The active allocations 218 may provide information on a current number of ports that are allocated to an endpoint device.

In one embodiment, the historical data 214 may include ED and general usage 220 and external metrics 222. The ED and general usage 220 may include historical usage trends for the endpoint. For example, the historical usage can indicate what applications are launched and/or websites are visited at what times by the endpoint device. For example, the historical data 214 may include a number of times the endpoint devices has accessed different websites. The historical data 214 may include a number of times different applications have been launched. The historical data 214 may include a duration of a communication session to the different websites or associated with the different applications that are launched. The ED and general usage 220 can then predict what application is going to be launched or what websites may be visited based on the time the endpoint device is activated.

In one embodiment, the historical usage may also be based on a user log in. For example, different users may log into the same endpoint device. The log-in information may be tracked for the different users. Thus, based on who logs into the endpoint device the machine learning algorithms 210 may analyze what type of application and/or website may be activated by the user that is logged into the endpoint device.

In one embodiment, the external metrics 222 may include data associated with third party websites and/or applications. For example, the external metrics 222 may include information such as an average number of ports needed for a particular website or application, a maximum number of ports needed, a minimum number of ports needed, and the like. The external metrics 222 may be obtained directly from the website or a server associated with a particular application. As updates to the website or server are made, the external metrics 222 may be periodically updated to reflect changes to the number of ports needed for a website or an application.

In one embodiment, the AS 114 may include a processor 202, a machine learning analytics component 204, a network address translation (NAT) provisioning component 206, and a NAT component 208. The processor 202 may be communicatively coupled to the machine learning analytics component 204, the network address translation (NAT) provisioning component 206, and the NAT component 208. The processor 202 may control functions and/or the execution of the machine learning analytics component 204, the network address translation (NAT) provisioning component 206, and the NAT component 208.

In one embodiment, the machine learning analytics component 204 may load one of the machine learning algorithms 210 to analyze the time series data 212 and/or the historical data 214 to predict a number of ports that may be needed for an endpoint device for a communication session.

The NAT provisioning component 206 may then dynamically allocate ports based on the predicted number of ports that is needed for the endpoint device. The NAT provisioning component 206 may either generate instructions to dynamically re-allocate ports within an existing public/routable IP address or assign a routable IP address to the endpoint device.

For example, if the number of ports that are needed for an endpoint device are too large to reallocate ports, the NAT provisioning component 206 may simply assign all of the ports of an available public/routable IP address to the endpoint. To illustrate, it may be determined that the endpoint device 116 may need 1000 ports for a new communication session request. However, only 500 ports may be available that can be reallocated from different endpoint devices that share a common IP address with the endpoint device 116. As a result, the endpoint device 116 may be allocated a new routable/public IP address and all of the ports of the IP address may be allocated to the endpoint device 116.

In another example, it may be determined that the endpoint device 116 may need 50,000 ports for the new communication session. Rather than continuously reallocating ports from other endpoint devices that share the same public IP address with the endpoint device 116, it may be more efficient to assign the endpoint device 116 a new routable/public IP address.

The NAT provisioning component 206 may also determine the number of ports that are available from other endpoint devices that share the same public IP address with the endpoint device 116. Based on the available ports and the number of ports needed by the endpoint device 116, the NAT provisioning component 206 may generate allocation instructions or a new IP address assignment. The allocation instructions or new IP address assignment may then be provided to the NAT component 208.

The NAT component 208 may include a session entry table 250. The session entry table 250 may track port assignments for the endpoint devices 116 and 118. For example, the session entry table 250 may indicate that the endpoint device 116 is assigned private IP address 10.0.0.1 and ports 1-10,000 and that the endpoint device 118 is assigned private IP address 10.0.0.2 and ports 10,001-20,000. When the port allocations are changed, the changes to the port allocation may be updated in a session entry table 250. The NAT component 208 may then perform the network address translations based on the updated session entry table 250.

Although the example illustrated in FIG. 2 uses machine learning algorithms, it should be noted that other predictive methods and/or modeling can be used to predict the port allocations and implement the dynamic port allocations of the present disclosure. For example, the historical data 214 may be used to extrapolate or predict the number of ports that may be needed by an endpoint device. For example, based on the ED and general use data 220, probabilities can be assigned to each application and/or website based on a time of day and/or user that logs into the endpoint device. When the endpoint device requests a communication session, the AS 114 may predict which application and/or website may be accessed based the highest probability at the time the requests is made.

Figure 3:
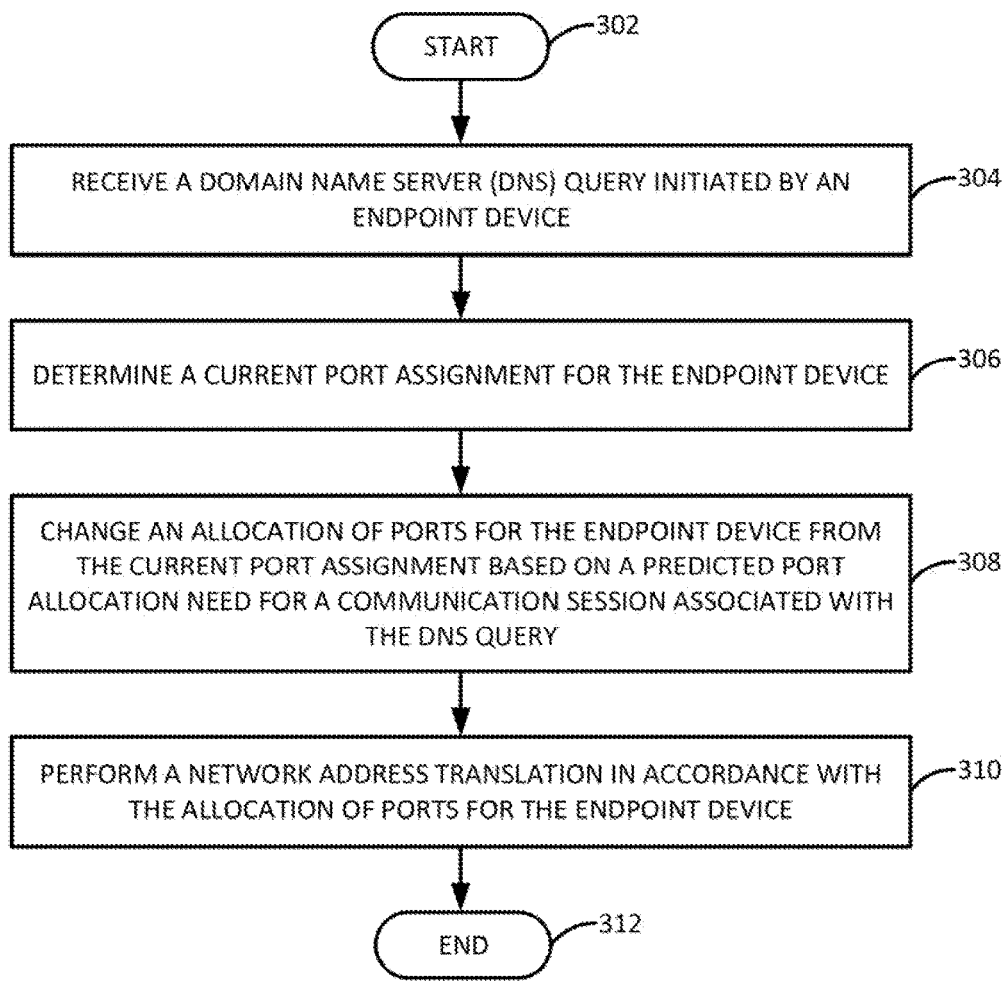
FIG. 3 illustrates a flowchart of an example method for dynamically allocating ports in a CG-NAT network, in accordance with the present disclosure.

FIG. 3 illustrates a flowchart of an example method 300 for dynamically allocating ports in a CG-NAT network, in accordance with the present disclosure. In one example, steps, functions and/or operations of the method 300 may be performed by a device as illustrated in FIG. 1, e.g., AS 114 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the AS 114 in accordance with the present disclosure. For illustrative purposes, the method 300 is described in greater detail below in connection with an example performed by a processing system, such as processing system 402.

The method 300 begins in step 302 and proceeds to step 304. In step 304, the processing system may receive a domain name server (DNS) query initiated by an endpoint device. For example, an endpoint may want to access a website or a server for an application that is to be executed by the endpoint device. The request to access the website may be sent as a request to the DNS to resolve the name of the website to a public IP address associated with the website. In one embodiment, the DNS query may be a DNS over hypertext transfer protocol (DoH) request that may contain more information.

In one embodiment, the DNS query may be provided to a machine learning analytics module that can analyze the request to predict a number of ports that may be needed for the communication session. The machine learning analytics may select a machine learning algorithm to analyze the data/information in the DNS query as well as other data. For example, the machine learning analytics module may analyze time series data (e.g., current endpoint device usage and current active port allocations) and historical data (e.g., endpoint device and general usage and external metrics) to predict a number of ports that may be needed for a particular service, e.g., a movie or video streaming service, a voice over IP call, a video conferencing call, a gaming service, a data file (e.g., text, multimedia, audio only, images only, etc.) download service, a general surfing of a website, and the like.

In one embodiment, the machine learning analytics module may also account for a particular user that is logged into the endpoint device. For example, different users may have different usage trends. In one embodiment, the machine learning analytics module may also account for a particular time of day. For example, the user may access certain websites or launch certain applications at certain times of the day, or certain days of the week, etc. For example, the user may access a news website at 9 am every morning or play an online video game at 8 PM every Saturday evening.

In one embodiment, the machine learning analytics module may also account for different endpoint devices of a user. For example, the user may have one endpoint device that is typically used for light web browsing and another endpoint device that is a gaming computer. Thus, when the media access control identification (MAC ID) associated with the gaming computer is identified in the DNS query, the machine learning analytics module may predict that the endpoint device is likely to launch an online gaming application instead of using a browser to visit various news sites.

In one embodiment, other methods may be used to predict the number of ports that may be required by the endpoint device. For example, data may be extrapolated from historical trends. For example, certain websites or applications may require a certain number of ports. Based on historical usage, a prediction may be made regarding which website or application may be accessed by the endpoint device. The number of ports that may be required may be based on the prediction of which website or application will be accessed.

In step 306, the processing system may determine a current port assignment for the endpoint device. For example, if the endpoint was not previously active, then the current port assignment may be zero. However, the endpoint may be active and have other active communication sessions that are assigned a certain number of ports.

In step 308, the processing system may change an allocation of ports for the endpoint device from the current port assignment based on a predicted port allocation need for a current communication session of the endpoint device (e.g., a newly established communication session or a communication session to be established). For example, the processing system may determine how many additional ports may be needed for the endpoint device based on the current port allocation and the predicted port allocation. To illustrate, an endpoint device may be currently allocated 5,000 ports. The endpoint device may have active communication sessions that are using 3,000 of the 5,000 ports. The processing system may predict that the endpoint device may require 10,000 ports for the application associated with the DNS query that is received. Thus, the endpoint device may need to be allocated an additional 8,000 ports (10,000 required-2,000 available ports).

In one embodiment, the additional ports may be temporarily re-allocated from another endpoint device. For example, a second endpoint device that shares the routable IP address may be allocated 10,000 ports. However, the second endpoint device may only be using 2,000 ports. Thus, the processing system may dynamically re-allocate 8,000 ports from the second endpoint device to the endpoint device that may need an additional 8,000 ports. When the endpoint device no longer needs the additional 8,000 ports (e.g., the communication session associated with the application is terminated), the 8,000 ports may be reallocated back to the second endpoint device.

In one embodiment, the re-allocation of ports may be permanent. For example, it may be determined that a first endpoint device is consistently being allocated an additional number of ports and/or a second endpoint is consistently lending ports from underutilization. As a result, the dynamic re-allocation of the ports from the second endpoint device to the first endpoint device may be made as a permanent reallocation.

In one embodiment, the number of needed ports may be so large that there may not be enough available ports on other endpoint devices that share the same routable IP address. As a result, the processing system may assign the endpoint device to a new routable IP address. All of the ports associated with the new routable IP address may then be allocated to the endpoint device. After the ports are dynamically reallocated, a session entry table in a network address translation module may be updated to reflect the changes.

In step 310, the processing system may perform a network address translation in accordance with the allocation of ports for the endpoint device. For example, data that is routed back to the endpoint device may be received by the processing system. The public IP address associated with access router connected to the endpoint device may be translated in accordance with the updated session entry table. For example, the public IP address may be converted into a private address and port numbers assigned to the endpoint device. In another example, if a new IP address was solely assigned to the endpoint device, the data may by-pass network address translation and be transmitted directly to the endpoint device via the access router.

In one embodiment, the communication sessions of the endpoints may be continuously monitored and the port allocations may be continuously re-allocated between the endpoints. For example, as communication sessions are deactivated the dynamically allocated ports may be returned to the endpoint device or devices that were originally assigned the ports. As new DNS queries are received to activate new communication sessions, ports may be dynamically re-allocated. The method 300 may end in step 312.

It should be noted that the method 300 may be expanded to include additional steps or may be modified to include additional operations with respect to the steps outlined above. In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for dynamically allocating ports in a CG-NAT network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300 or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for dynamically allocating ports in a CG-NAT network (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for dynamically allocating ports in a CG-NAT network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
receiving, by a processing system comprising at least one processor, a domain name server query initiated by an endpoint device;
determining, by the processing system, a current port assignment for the endpoint device;
predicting, by the processing system, a number of ports needed by the endpoint device for use in a communication session with another device, the number of ports predicted based on the domain name server query that is received, wherein the number of ports that is predicted is based on an analysis of historical trends, wherein the historical trends comprise an average number of ports associated with a destination of the domain name server query;
changing, by the processing system, an allocation of ports for the endpoint device from the current port assignment based on the number of ports that is predicted; and
performing, by the processing system, a network address translation in accordance with the allocation of ports for the endpoint device.

2. The method of claim 1, wherein the domain name server query comprises a domain name server over hypertext transfer protocol.

3. The method of claim 1, wherein the number of ports that is predicted is based on an analysis from a machine learning algorithm.

4. The method of claim 3, wherein the machine learning algorithm analyzes time series information and historical information.

5. The method of claim 4, wherein the time series information comprises usage of the endpoint device and active port allocations.

6. The method of claim 4, wherein the historical information comprises historical usage of the endpoint device and at least one external metric.

7. The method of claim 6, wherein the at least one external metric comprises a second average number of ports needed for an application associated with the communication session.

8. The method of claim 1, wherein the number of ports that is predicted is based on a user log in at the endpoint device.

9. The method of claim 1, wherein the number of ports that is predicted is based on an application executed by the endpoint device.

10. The method of claim 1, wherein the changing the allocation of ports comprises determining a quantity of ports currently available for allocation to the endpoint device, assigning a new routable internet protocol address to the endpoint device based on the number of ports that is predicted and the quantity of ports that is determined, and allocating all ports of the new routable internet protocol address to the endpoint device.

11. The method of claim 1, wherein the changing the allocation of ports comprises removing an allocation of ports from one or more additional endpoint devices that share a routable internet protocol address with endpoint device.

12. The method of claim 1, wherein the changing the allocation of ports comprises:
updating a session entry table of a network address translation device, wherein the session entry table tracks port assignments for the endpoint device.

13. The method of claim 1, further comprising:
monitoring, by the processing system, an activity associated with the communication session;
predicting, by the processing system, a second number of ports based on a change in the activity of the endpoint device in the communication session; and
changing, by the processing system, the allocation of ports in accordance with the second number of ports that is predicted.

14. The method of claim 13, wherein the changing the allocation of ports in accordance with the second number of ports that is predicted comprises:
allocating, by the processing system, additional ports to the endpoint device.

15. The method of claim 13, wherein the changing the allocation of ports in accordance with the second number of ports that is predicted comprises:
reducing, by the processing system, a number of ports that are allocated to the endpoint device.

16. A non-transitory computer-readable medium storing instructions which, when executed by a processing system including at least one processor, cause the processing system to perform operations, the operations comprising:
receiving a domain name server query initiated by an endpoint device;
determining a current port assignment for the endpoint device;
predicting a number of ports needed by the endpoint device for use in a communication session with another device, the number of ports predicted based on the domain name server query that is received, wherein the number of ports that is predicted is based on an analysis of historical trends, wherein the historical trends comprise an average number of ports associated with a destination of the domain name server query;
changing an allocation of ports for the endpoint device from the current port assignment based on the number of ports that is predicted; and
performing a network address translation in accordance with the allocation of ports for the endpoint device.

17. The non-transitory computer-readable medium of claim 16, wherein the number of ports that is predicted is based on an analysis from a machine learning algorithm.

18. A device comprising:
a processing system including at least one processor; and
a non-transitory computer-readable medium storing instructions which, when executed by the processing system, cause the processing system to perform operations, the operations comprising:
receiving a domain name server query initiated by an endpoint device;
determining a current port assignment for the endpoint device;
predicting a number of ports needed by the endpoint device for use in a communication session with another device, the number of ports predicted based on the domain name server query that is received, wherein the number of ports that is predicted is based on an analysis of historical trends, wherein the historical trends comprise an average number of ports associated with a destination of the domain name server query;
changing an allocation of ports for the endpoint device from the current port assignment based on the number of ports that is predicted; and
performing a network address translation in accordance with the allocation of ports for the endpoint device.

19. The device of claim 18, wherein the domain name server query comprises a domain name server over hypertext transfer protocol.

20. The device of claim 18, wherein the number of ports that is predicted is based on an analysis from a machine learning algorithm.

\* \* \* \* \*